United States Patent [19]

Erpelding

[11] Patent Number: 5,708,541
[45] Date of Patent: Jan. 13, 1998

[54] TERMINATION PAD MANIPULATOR FOR A LAMINATED SUSPENSION IN A DATA STORAGE SYSTEM

[75] Inventor: A. David Erpelding, San Jose, Calif.

[73] Assignee: International Business Machines Corporation

[21] Appl. No.: 664,927

[22] Filed: Jun. 7, 1996

Related U.S. Application Data

[63] Continuation of Ser. No. 246,025, May 19, 1994, abandoned.

[51] Int. Cl.$^6$ ................................................. G11B 21/16
[52] U.S. Cl. ........................................ 360/104; 369/244
[58] Field of Search ............................. 360/106, 104; 369/244, 222

[56] References Cited

U.S. PATENT DOCUMENTS

| | | | |
|---|---|---|---|
| 4,789,914 | 12/1988 | Ainslie et al. | 360/104 |
| 4,792,875 | 12/1988 | Ohdaira | 360/104 |
| 4,996,623 | 2/1991 | Erpelding et al. | 360/104 |
| 5,012,368 | 4/1991 | Bosier et al. | 360/104 |
| 5,074,029 | 12/1991 | Brooks, Jr. et al. | 29/603 |
| 5,103,359 | 4/1992 | Marazzo | 360/104 |
| 5,391,842 | 2/1995 | Bennin et al. | 360/106 |
| 5,422,764 | 6/1995 | McIlvanie | 360/106 |

FOREIGN PATENT DOCUMENTS

| | | |
|---|---|---|
| 4-069803 | 3/1992 | Japan. |
| 2193833 | 2/1988 | United Kingdom. |

OTHER PUBLICATIONS

Reidenbach, J.R., Combination Suspension-Lead Cble For A Multi-Gap Read/Write Head, *IBM Technical Disclosure Bulletin*, vol. 22, No. 4, Sep. 1979, pp. 1602-1603.

S. Puttanaik, Method for Slider Attachment and Head Termination to a Suspension in a Disk File, *IBM Technical Disclosure Bulletin*, vol. 36, No. 02, Feb. 1993, p. 371.

*Primary Examiner*—Craig A. Renner
*Attorney, Agent, or Firm*—Noreen A. Krall; Andrew J. Dillon

[57] ABSTRACT

A multilayered suspension having a slider end and a termination end, the suspension being suitable for use in an information storage system slider-suspension assembly is provided. The suspension comprises a conductive lead structure having at least one conductor line contained in a patterned conductive layer formed over one or more layers. The conductive lead structure is suitable on the slider end for connection to transducer leads of a slider, and on the termination end for connection to arm-electronics termination pads. The suspension further comprises a fixture, formed from one or more layers, being substantially in the same plane as the termination end of the conductive lead structure and having one or more anchor tabs laminated to a layer of the conductive lead structure. The fixture is suitable for aligning the conductor lines to the termination pads by rotating the termination end of the conductive lead structure in the plane of the termination end.

58 Claims, 6 Drawing Sheets

TERMINATION PAD MANIPULATOR FOR A LAMINATED SUSPENSION IN A DATA STORAGE SYSTEM

This is a continuation of application Ser. No. 08/246,025, filed May 19, 1994, now abandoned.

BACKGROUND OF THE INVENTION

1. Technical Field

This invention relates to slider-suspension assemblies for data recording information storage systems and to a method for making such assemblies. In particular, the invention relates to an improved suspension for a magnetic disk drive system and method for electrically connecting the suspension to actuator arm leads or an electronic package.

2. Description of the Related Art

Information storage devices, which include magnetic storage devices and optical data storage systems, utilize at least one rotatable disk with concentric data tracks containing the information, a transducer for reading data from or writing data to the various tracks, and a head positioning actuator connected to the head for moving it to the desired track and maintaining it over the track centerline during read or write operations. The transducer is attached to a head (or "slider") having an air bearing surface which is supported adjacent the data surface of the disk by a cushion of air generated by the rotating disk. The slider is attached on its back side (the side opposite the air bearing surface) to the suspension, and the suspension is attached to an actuator arm of the head positioning actuator.

The suspension provides dimensional stability between the slider and actuator arm, controlled flexibility in pitch and roll motion of the slider relative to its direction of motion on the rotating disk, and resistance to yaw motion. The suspension typically provides a load or force against the slider which is compensated by the force of the air bearing between the slider's air bearing surface and the disk surface. Thus, the slider is maintained in extremely close proximity to, but out of contact with, the data surface of the disk. The suspension typically comprises a load beam, which is mounted at one end to the actuator arm, and a flexure element which is attached to the other end of the load beam and supports the slider. The load beam provides the resilient spring action which biases the slider toward the surface of the disk, while the flexure provides flexibility for the slider as the slider rides on the cushion of air between the air bearing surface and the rotating disk. Such a suspension is described in U.S. Pat. No. 4,167,765, which is assigned to the same assignee as this application. An example of a conventional slider is described in U.S. Pat. No. 3,823,416, which is assigned to the same assignee as this application.

One type of composite or laminated structure comprising a base layer, a patterned conductive layer with patterned electrical leads formed thereon, and an insulating layer formed in between, is described in IBM Technical Disclosure Bulletin, Vol. 22, No. 4 (September, 1979), pp. 1602–1603. In this laminated suspension, the slider is epoxy bonded to the laminated suspension and the transducer leads are soldered to the electrical leads formed on the suspension.

Another laminated structure type of suspension comprised of a base layer of stainless-steel, an insulating layer of polyimide formed on the base layer, and a patterned conductive layer of etched copper alloy formed on the insulating layer, is described in U.S. Pat. No. 4,996,623. The etched copper layer provides a lead structure electrically connecting the thin-film magnetic head transducer and the disk drive's read/write electronics. A method for attaching a slider to a laminated/etched suspension in a data recording disk file has been described in U.S. Pat. No. 4,761,699 and IBM Technical Disclosure Bulletin, Vol. 36, No. 2, February, 1993.

The slider-suspension assembly (or "head-gimbal assembly" (HGA)) is an integrated unit composed of the slider being electrically and mechanically attached to the suspension. All head-gimbal assemblies on the market today use discrete wires to conduct a signal from the magnetic transducer on the slider (or "head") to the read/write electronics package. These wires are terminated to flex cables or electronic component cards integral to the actuator arm. In order to make this termination, the wires are positioned over termination pads residing on the flex cable or electronics package and then electrically connected to the termination pads by either a reflow soldering operation or an ultrasonic wire bond process. A majority of the disk drive industry uses a manual termination process involving skilled operators using microscopes and tweezers to place these wires individually over the termination pads. The disadvantages to this type of manual process are time, tedium and inconsistent results inherent in a manual process.

IBM uses an automated process which involves stringing the wires onto a frame that holds the wires in alignment for placement over the pads. This eliminates the variability due to a manual process. However, there are still variables due to wire tension and tolerances in the frame in its attachment to the suspension. Even without these variables, there is still the need to align the frame with its wires over the termination pads of the electronics package or flex cable. This alignment is necessary because during the assembly of the electronics package to the actuator arm there are assembly tolerances as well as component tolerances that add up to an inconsistency of where the pads are located. This inconsistency, in conjunction with wire location variables, occasionally require the robot performing the electrical terminations to make small adjustments for each wire-pad termination.

Therefore, it would be desirable to provide an improved automated process for electrically connecting the head-gimbal assembly with the actuator arm electronics package or flex cable which eliminates the tolerances introduced by a wire frame and its attachment to the suspension. It would be further desirable to provide such an automated process which can simply and accurately align the conductor lines of the head-gimbal assembly with the termination pads of the electronics package or flex cable.

SUMMARY OF THE INVENTION

According to the present invention, a multilayered suspension is provided having a slider end and a termination end and the suspension being suitable for use in an information storage system slider-suspension assembly. The suspension comprises a conductive lead structure having at least one conductor line contained in a patterned conductive layer formed over one or more layers. The conductive lead structure is suitable on the slider end for connection to transducer leads of a slider and on the termination end for connection to arm-electronics termination pads. The suspension further comprises a fixture, formed from one or more layers, being substantially in the same plane as the termination end of the conductive lead structure and having one or more anchor tabs laminated to a layer of the conductive lead structure. The fixture is suitable for aligning the conductor lines to the termination pads by rotating the termination end of the conductive lead structure in the plane of the termination end.

The above as well as additional features and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
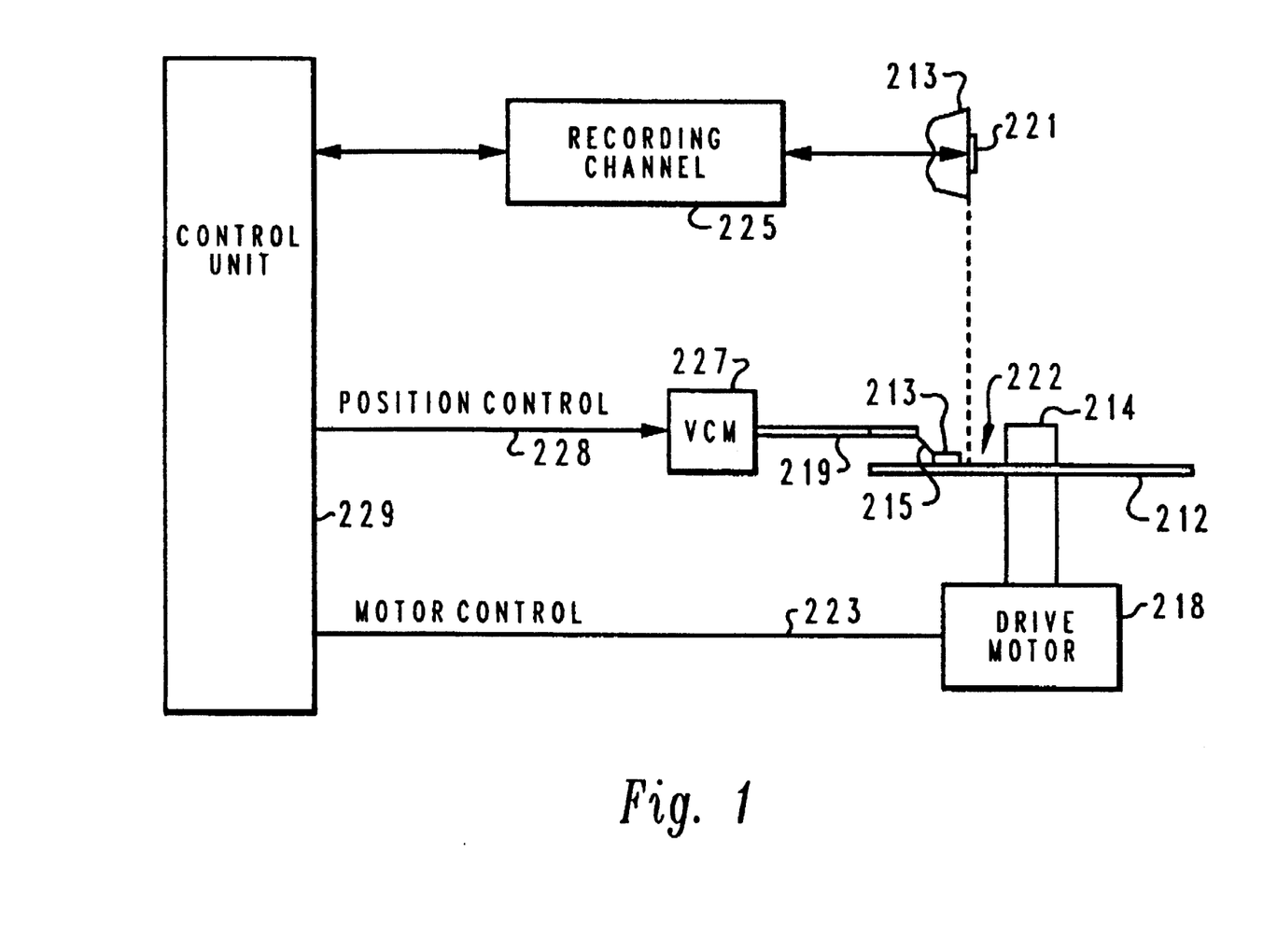
FIG. 1 depicts a magnetic disk storage system.

Although the present invention is described as embodied in a magnetic disk storage system as shown in FIG. 1, it will be apparent that the invention is also applicable to other information storage systems such as an optical data storage system or a magnetic tape recording system, for example. At least one rotatable magnetic disk 212 is supported on a spindle 214 and rotated by a disk drive motor 218. The magnetic recording media on each disk is in the form of an annular pattern of concentric data tracks (not shown) on disk 212.

At least one slider 213 is positioned on the disk 212, each slider 213 is supporting one or more magnetic read/write heads 221. As the disks rotate, the sliders 213 are moved radially in and out so that the heads 221 may access different portions of the disk surface 222 containing the data. Each slider 213 is attached to an actuator arm 219 by means of a suspension 215. The suspension 215 provides a slight spring force which biases the slider 213 against the disk surface 222. Each actuator arm 219 is attached to an actuator means 227. The actuator means shown in FIG. 1 is a voice coil motor (VCM). The VCM is a coil moveable within a fixed magnetic field, and the direction and velocity of the coil movements is controlled by the current supplied.

During operation of the disk storage system, the rotation of the disk 212 generates an air bearing between the slider 213 and the disk surface 222. The air bearing thus counterbalances the slight spring force of the suspension 215 and supports the slider 213 off the disk surface by a small, substantially constant spacing during operation. Although an air bearing is described with the preferred embodiment, any fluid bearing may be used including an oil lubricant.

The various components of the disk storage system are controlled in operation by signals generated by control (read/write electronics) unit 229, such as access control signals and internal clock signals, and which includes logic control circuits, storage means and a microprocessor. The control unit 229 generates control signals to control various system operations such as motor control signals on line 223 and head position control signals on line 228. The control signals on line 228 provide the desired current profiles to optimally move and position a selected slider 213 to the desired data track on the associated disk 212. Read and write signals are communicated to and from read/write heads 221 by means of recording channel 225, which includes conductor lines running along suspension 215 and actuator arm 219.

Figure 2:
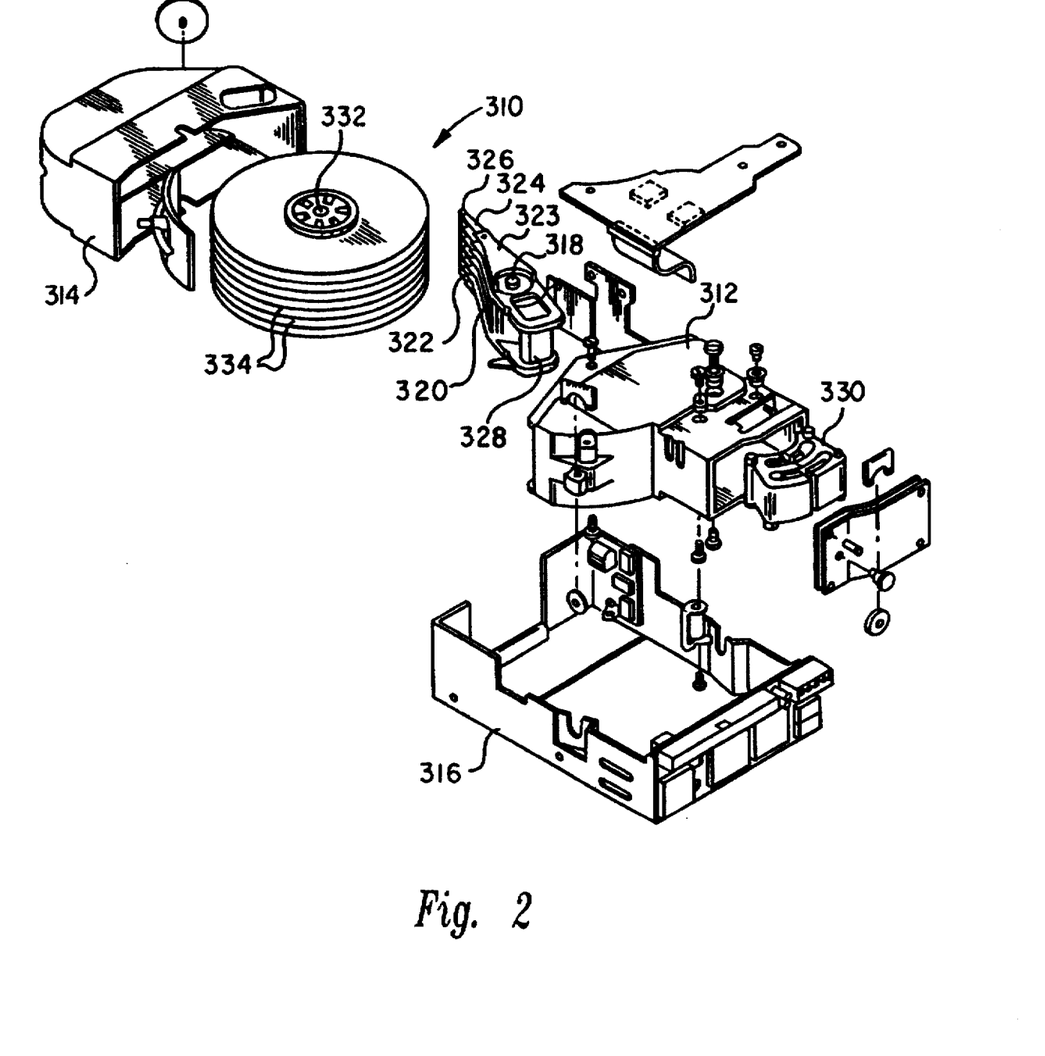
FIG. 2 depicts an exploded view of a disk drive.

The above description of a typical magnetic disk storage system, and the accompanying illustration of it in FIG. 1 are for representation purposes only. The invention described in this application is useful with all mechanical configurations of magnetic storage systems disk drives or direct access storage devices ("DASD"). It should be apparent that disk storage systems may contain a large number of disks and actuators, and each actuator may support a number of sliders. For example, FIG. 2 is an exploded view of a disk drive 310. It should be noted that although a rotary actuator is shown, the invention described herein is also applicable to linear actuators. The disk drive 310 includes a housing 312, and a housing cover 314 which, after assembly, is mounted within a frame 316. Rotatably attached within the housing 312 on an actuator shaft 318 is an actuator arm assembly 320. One end of the actuator arm assembly 320 includes an E block or comb like structure 322 having a plurality of actuator arms 323. Attached to the separate arms 323 on the comb or E block 322 are spring suspensions 324. Attached at the end of each spring suspension is a slider 326 which carries a magnetic transducer (not shown in FIG. 2). On the other end of the actuator arm assembly 320 opposite the spring suspensions 324 and the sliders 326 is a voice coil 328.

Attached within the housing 312 is a pair of magnets 330. The pair of magnets 330 and the voice coil 328 are key parts of a voice coil motor which applies a force to the actuator assembly 320 to rotate it about the actuator shaft 318. Also mounted within the housing 312 is a spindle shaft 332. Rotatably attached to the spindle shaft 332 are a number of disks 334. In FIG. 2 eight disks are attached to the spindle shaft 332. The disks 334 are attached to the spindle shaft 332 in spaced apart relation.

Figure 3:
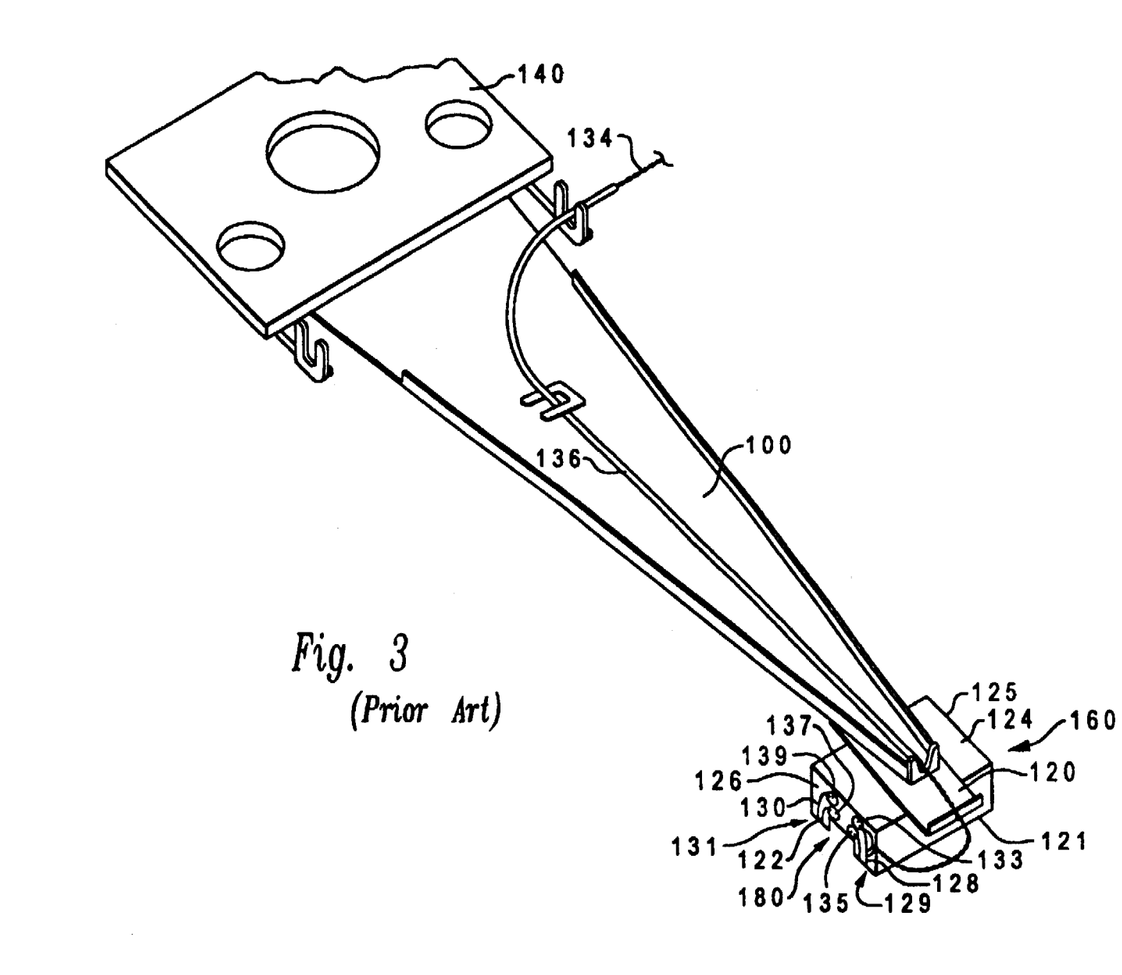
FIG. 3 shows a conventional slider-suspension assembly.

For an example of a prior art subassembly, see FIG. 3. The prior art suspension comprises a load beam 100 and a flexure 120 located at the end of load beam 100. The suspension is attached to the disk file actuator arm (not shown) by means of a mounting plate 140. The slider 160 is a conventional slider formed of ceramic material, such as a mixture of alumina ($Al_2O_3$) and titanium carbide (TIC). The slider 160 has an air bearing surface 180, which includes two rails 121, 122, a back side 124 opposite and generally parallel to air bearing surface 180, a leading edge 125 and a trailing edge 126, both of which form end faces oriented generally perpendicular to air bearing surface 180 and back side 124. Slider 160 is secured to flexure 120 by an epoxy bond between back side 124 and flexure 120.

Located on the trailing edge 126 of slider 160 are two thin-film read/write transducers 128, 130. Typically, multiple thin-film transducers are formed on a single slider, even though only one transducer is active as a read/write element, in order to improve the yield of the slider during the thin-film fabrication process. The transducers 128, 130 have pole tips 129, 131, respectively, which extend toward the edge of respective rails 121, 122. Transducer 128 has electrical leads 133, 135 and transducer 130 has electrical leads 137, 139 for connection to the read/write electronics of the disk drive.

In the prior art suspension shown in FIG. 3, the electrical attachment to the read/write electronics is made by twisted wires 134 which extend from the read/write electronics of the magnetic storage system, through a tube 136 on load beam 100 and out the end of tube 136. The ends of wires 134 are ultrasonically bonded to the leads 133, 135 of active transducer 128. The electrical connection of the transducer 128 by means of the twisted wires 134 is made by manual fabrication.

Figure 4:
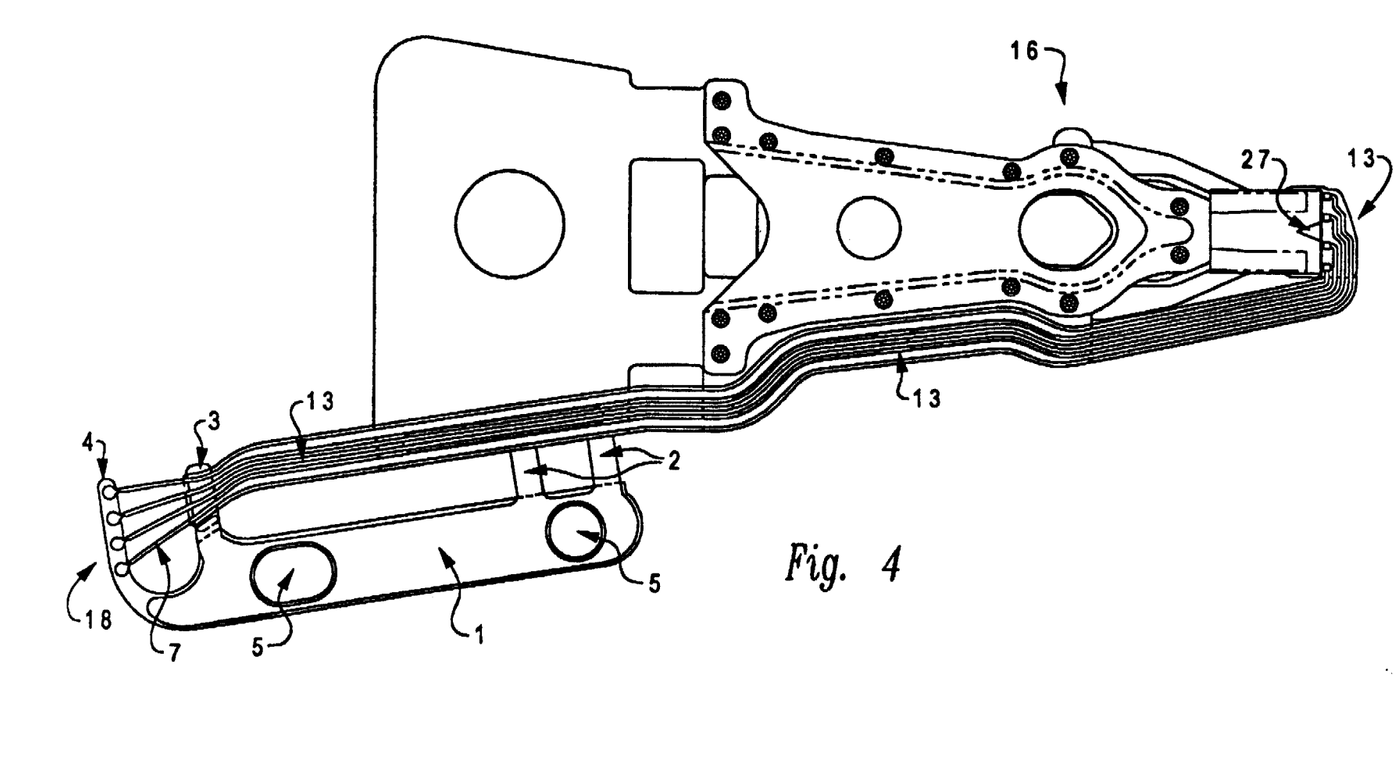
FIG. 4 depicts a suspension, according to a preferred embodiment of the present invention.

Referring now to FIG. 4, there is depicted a suspension according to a preferred embodiment of the present invention. Suspension 16 is a laminated suspension comprised of multiple layers of material etched using photolithographic techniques, as are well known in the industry, to create the suspension. Suspension 16 comprises a base layer preferably of stainless steel, an insulating layer preferably of polyimide, and a patterned conductive layer preferably of a copper alloy. This multilayered suspension is formed by laminating three very thin sheets of different materials together. This multilayer sheet has two metal layers formed on either side of an insulating layer of polyimide that are processed using photolithographic techniques. All three layers are etched away to form the outline of the suspension 16. Then both sides of the suspension are etched to remove desired sections of the steel, polyimide and copper layers to produce the various features of the suspension. In particular, the copper layer is etched to produce the conductive lead structure which contains transmission wires and termination pads for electrically connecting the slider's transducer leads with termination pads located on the actuator arm. Alternatively, suspension 16 may be comprised of an etched flex cable bonded to a sturdy base layer.

Starting at the slider end 17, suspension 16 is suitable for making connection to the transducer conductor lead termination pads of an attached slider 27. A conductive lead structure 13 is composed of four conductor lines that travel from slider 27 to test pads 14 located at termination end 18. The conductive lead structure is etched in the copper patterned conductive layer of suspension 16.

Figure 5:
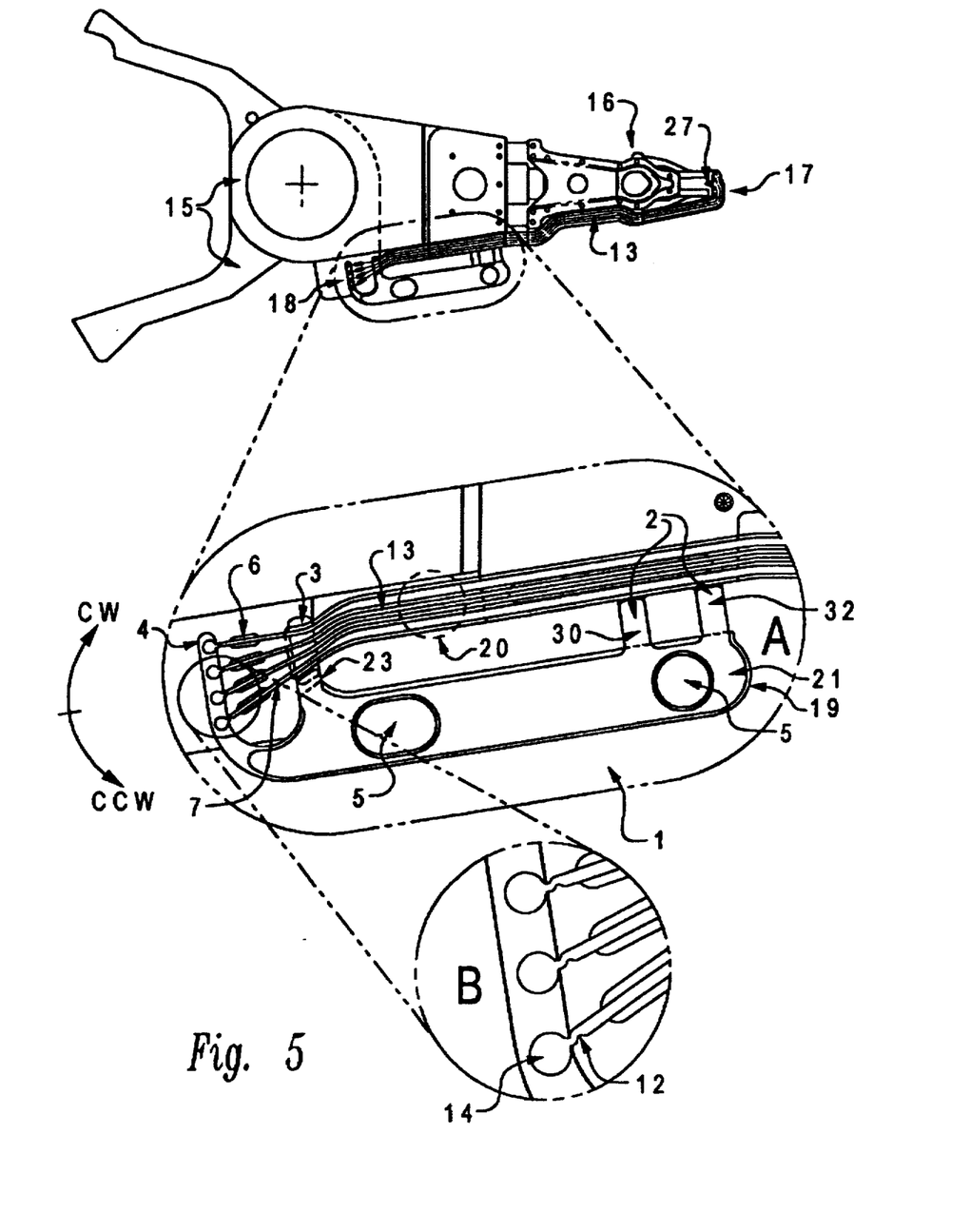
FIG. 5 depicts an actuator arm suspension assembly, according to a preferred embodiment of the present invention.

Referring now to FIG. 5, there is depicted a suspension-actuator arm assembly having a manipulator, according to the present invention. Suspension 16 has been spot welded or epoxy bonded to actuator arm 15. The conductor lines 7 transmit transducer signals from transducer leads on the head to arm-electronics termination pads 6 located on actuator arm 15, as seen in magnified view 5A, where the signals are transmitted to, or processed by, the storage system read/write electronics.

As conductive lead structure 13 extends out beyond the slider end 17 of suspension 16 toward termination end 18, conductive lead structure 13 is formed from only two layers, the polyimide layer and the etched copper layer, wherein the base layer was removed or never formed in that region. Thus, conductive lead structure 13 extends out to the termination end 18, as seen in magnified view 5A, as a single flexible cable of four conductor lines 7 formed on top of an insulating polyimide layer. However, near termination end 18, the strain relief tab 3 is formed from a base layer of stainless steel. The insulating layer under the conductive lead structure 13 ends just after the strain relief tab 3, towards termination end 18, allowing conductor lines 7 to extend out to hook 4 as single copper lines. Conductor lines 7 connect with hook 4 on copper test pads 14, as seen in magnified view 5B. Conductor lines 7 have a fixed and spaced relationship along hook 4 which allows them to be directly aligned over each of the termination pads 6. Since both the termination pads and the conductor lines are fabricated using photolithographic processes, the spacing tolerances between the termination pads to themselves and the conductor lines to themselves are on the order of 1 to 2 microns.

The present invention is a fixture, here called a manipulator, that is attached to conductive lead structure 13, which allows for an accurate and efficient positioning of all the conductor lines 7 with respect to the termination pads 6. The manipulator 1 includes flexible anchor tabs 2, anchor tab 23, and hook 4. This fixture is connected to conductive lead structure 13 by the flexible anchor tabs 2 and by anchor tab 23 at strain relief tab 3. Also, hook 4 is connected to each of the conductor lines 7. Manipulator 1 also has tooling holes 5 that allow an operator or robot to rotate manipulator 1 in the plane of conductor lead structure 13 to bring the conductor lines 7 into alignment with termination pads 6.

A multilayered laminated suspension is generally either a flat, flexible sheet of material laminated on both sides with patterned metal layers or a composite of multilayers formed by vapor deposition and the features of the suspension are created with photolithographic etching techniques. In the preferred embodiment, manipulator 1 is designed into the suspension and is fabricated, at no additional cost, with the rest of the laminated suspension's multiple layers. In a preferred embodiment, manipulator 1 is formed from all three layers. As seen in FIG. 4, it is made primarily from a base layer of stainless steel 19 which provides support and rigidity to the manipulator structure, an insulating layer of polyimide formed on top of the steel layer, and an etched conductive copper layer 21 containing conductive lines formed on top of the insulating layer. Thus, manipulator 1 is formed as part of a single multilayered laminated suspension 16, wherein the suspension also includes conductive lead structure 13. Conductive layer 21 covers most of the body of manipulator 1, except that it does not extend out to hook 4. This is necessary to keep test pads 14 electrically isolated from each other. It should be noted that a layer of polyimide is not a necessary component to the structure of the present invention, and therefore, it may be eliminated in an alternative embodiment of the present invention.

As shown in FIG. 5A, conductive layer 21 extends out beyond base layer 19 to attach with conductive lead structure 13 at three points. First, conductive layer 21 extends out at anchor tab 23 to make an attachment with strain relief tab 3. As can be seen in FIG. 5A, underneath anchor tab 23 there is a small channel where the stainless steel base layer 19 has been etched away or was never formed. Thus, strain relief tab 3 and base layer 19 are not directly connected. However, both base layer 19 and strain relief tab 3 are partially laminated by a section of conductive layer 21 formed on top. The edges of the steel layer are seen in the figure as dashed lines under anchor tab 23. Although conductive layer 21 is formed at one end of strain relief tab 3, it is not connected to conductor lines 7 or the underlying polyimide layer which comprise conductive lead structure 13.

In a similar manner, flexible anchor tabs 2 are extensions of conductive copper layer 21 which extend out beyond stainless steel base layer 19 and make the second and third attachments to conductive lead structure 13. Flexible anchor tabs 2 are laminated to small sections of the insulating polyimide layer of conductive lead structure 13, or alternatively, to small extensions of a supporting base layer that does extend out to termination end 18. These small sections can be seen in the figure at attachment points 30 and 32. The dashed lines indicate the hidden edges of the steel layer hidden under the tips of anchor tabs 2. Additionally, a thin layer of polyimide may be formed under flexible anchor tabs 2 and/or the entire conductive layer 21 to provide additional support to the manipulator structure. Additionally, hook 4 is connected with each of the conductor lines 7. Although the manipulator of the preferred embodiment has been described as having anchor tabs 2, 23 it should be understood that the manipulator of the present invention may be designed with a greater number or a fewer number of anchor tabs connecting the manipulator to the conductive lead structure. Moreover, in its simplest form, the manipulator fixture may be merely an extended hook arm 4 having as its only connection to the conductive lead structure the individual connections to each of the conductive lines which comprise part of the conductive lead structure. Therefore, as used in the present invention, the term "anchor tab" is intended to include a hook arm such as hook arm 4 as an anchor point for attachment to the conductive lead structure.

During the manufacture of a disk drive, the manipulator of the present invention greatly facilitates the assembly of the actuator arm with the suspension, specifically during the alignment of conductor lines 7 with termination pads 6. The integrated nature of the conductive lead structure allows all four conductor lines to be aligned simultaneously, thus, requiring only one alignment procedure rather than the four which would be required with four discrete wires. This one time alignment may be done manually or robotically by manipulating manipulator 1. Moreover, the addition of a hook extending out from the fixture and attached to the ends of each of the conductor lines maintains the conductor lines in a fixed and spaced relationship that exactly matches the spaced relationship of the termination pads, further facilitating the alignment of all four conductor lines simultaneously.

To begin assembly, suspension 16 is attached to actuator arm 15 with swaged rivets, machine screws, laser welding, or epoxy bonding. This may be performed before or after the slider has been attached to the suspension. Conductive lead structure 13 and manipulator 1 extend out beyond the body of suspension 16 along the edge of actuator arm 15. Conductive lead structure 13 and manipulator 1 have not yet been attached to actuator arm 15. Because the section of conductive lead structure 13 located near termination end 18 is composed primarily of a thin layer of copper alloy and a thin layer of polyimide, it is extremely flexible and may be rotated in, or perpendicular to, the plane of conductive lead structure 13 near termination end 18. Most of the rotation, or yaw motion, will originate in the area outlined by dashed circle 20, which is located to the slider end 17 of flexible anchor tabs 2 and to the termination end 18 of the body of suspension 16.

A rotational moment is introduced to the manipulator by applying a tool or robotic end effectuator to tooling holes 5 in manipulator 1. The rotational moment is produced such that manipulator 1 rotates about an axis through the center of the circular tooling hole 5 and rotates manipulator 1 and the termination end 18 of conductor lead structure 13 in the plane of conductor lead structure 13 (i.e. in the plane of the page of FIG. 5) in either a clockwise (CW) or counterclockwise (CCW) direction. As the rotational moment is applied, hook arm 4, flexible anchor tabs 2 and anchor tab 23 apply torque to termination end 18, causing conductive lead structure 13 to rotate. Conductor lines 7 are moved across until they are accurately aligned over termination pads 6 on actuator arm 15.

The rotational moment causes the flexible anchor tabs 2 to alternately buckle, depending on the direction of rotation. Because flexible anchor tabs 2 are formed from a relatively thin conductor layer 21 (and possibly an underlayer of polyimide), a rotational moment will place one flexible anchor tab in tension and the other flexible anchor tab in compression. Due to its flexible nature, the flexible anchor tab in compression will buckle while the one in tension will resist any deformation. The buckling action of one flexible anchor tab and the resistive action of the other allows a small amount of angular displacement between the two, thus allowing rotation and torque to be transmitted to the conductive lead structure 13. Torque is transmitted to conductive lead structure 13 through hook arm 4 and anchor tab 23. Transmitting torque at both ends of conductor lines 7 through hook arm 4 and anchor tab 23 isolates lines 7 from any resisting forces that would distort conductor lines 7. One source of resisting force results from the area outlined by dashed circle 20 as it deflects under the rotation, or yaw motion, of conductive lead structure 13. Another source of resisting force results from conductor lines 7 moving in contact on termination pads 6, which produces frictional drag.

An additional advantage to flexible anchor tabs 2 is that they limit the degrees of freedom for doing the alignment. The flexible anchor tabs 2 provide a rotating action in the plane of the manipulator 1 about an axis approximately between the two flexible anchor tabs, while restraining any lateral translation of conductor lead structure 13. This simplifies the alignment procedure since more skill on the part of an operator or demands on a robot would be required if translational degrees of freedom were allowed. Once the conductor lines 7 have been aligned over the termination pads 6, they are terminated (i.e. electrically connected) by either a reflow soldering operation or an ultrasonic wire bond process.

According to another feature of the present invention, once the conductor lines have been successfully terminated to the termination pads, manipulator 1 may be detached from conductive lead structure 13 and discarded. The layers of flexible anchor tabs 2 have a minimal amount of overlap with the base (or insulating layer) at the attachment points 30 and 32 on conductive lead structure 13. Similarly, there is a minimum amount of overlay between anchor tab 23 and the base layer that comprises the strain relief tab 3. Therefore, a small interface of copper and steel act as anchoring points for the manipulator 1. These anchoring points are strong for withstanding in-plane forces, such as those imposed during the rotation and alignment procedure. But when the forces are out of the plane of the manipulator there is a tendency for the conductive copper layer to delaminate or peel from the stainless steel base layer because of the small interface between the layers. Alternatively, the anchor tabs could be torn in half or cut along a region of reduced thickness.

Once the flexible anchor tabs 2 and anchor tab 23 have been removed, manipulator 1 continues to be rotated out of the plane of the conductive lead structure. Hook 4 continues to rotate at a right angle to conductor lines 7 until the conductor lines break at small notches 12 that have been etched in conductor lines 7 (as seen in magnified view B) to create defined weak areas for breaking the conductor lines from their anchor points on hook 4. The breaking of conductor lines 7 at notches 12 is further promoted by the inside edge of hook 4 which is etched from the vertical direction with an angle such that it has a sharp knife-like edge. As hook 4 is rotated, the knife-like edge cuts into conductor lines 7 at notch 12, facilitating the break and reducing the chance that removing the manipulator will damage the terminations, for example by lifting a conductor line from a termination pad.

Once the manipulator has been removed from the conductive lead structure and the laminated suspension, it is discarded. At this point, strain relief tab 3 may be secured to the actuator arm to prevent any deformation of the conductive lead structure from transmitting an unwanted force into the termination joint. This tab is attached to the actuator arm by a spot of adhesive. This provides the soldered connections relief from stress and strain that might be transferred along the laminated suspension after assembly.

Figure 6:
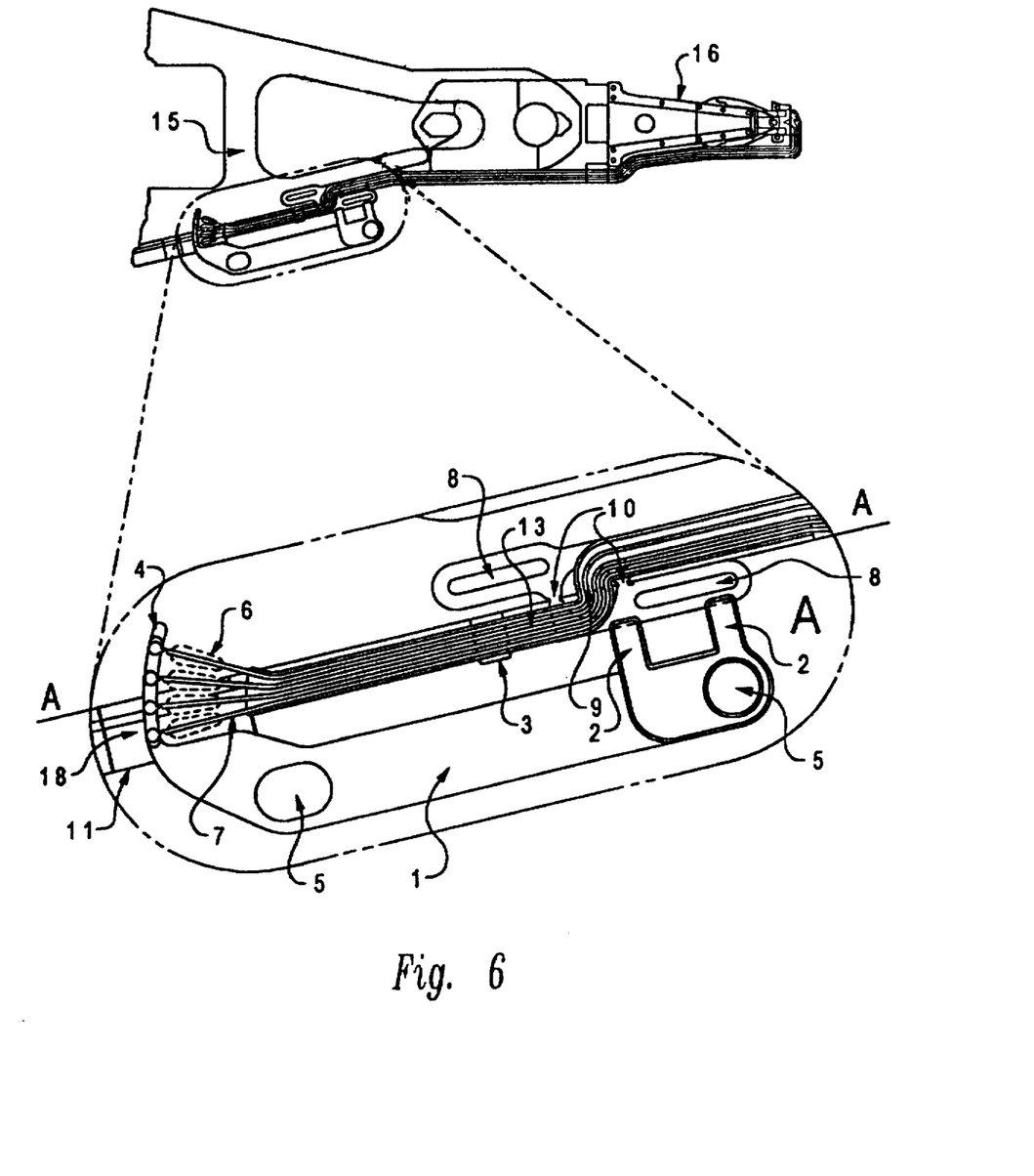
FIG. 6 depicts an actuator arm assembly, according to an alternative preferred embodiment of the present invention.

With reference now to FIG. 6, there is shown an alternative preferred embodiment of the present invention. Some actuator arm designs require that the arm-electronics termination pads be mounted on a surface 11 (out of the plane of the drawing), perpendicular to the plane of the suspension 16 and actuator arm 15. In these designs, conductor lines 7 must be folded below the plane of the suspension 16 to align with the termination pads 6 (shown in dashed lines because they are not visible in the view shown). This folding is accomplished in bend region 9 by folding conductor lead structure 13 along folding line A—A. This folding is accomplished with notched areas 10 in the steel which provide a weak area for preferential bending about folding line A—A. The conductor lines of the conductive lead structure in the area of the bend region 9 traverse the bend region 9 perpendicular to the bend axis A—A. This reduces the risk of fracturing in the conductor lines. Additionally, if conductive lead structure 13 was formed with a stainless steel base layer, the steel running under folding line A—A would be removed to allow the conductor lines to assume a natural bend radius around the fold line.

Tacking points 8, formed in stainless steel, are also included for additional anchoring of the conductive lead structure 13 after termination is completed. The design allows tacking with a drop of adhesive through holes in the center of these tacking points 8. A spot weld could also be used to attach tacking points 8.

Once the manipulator has been folded into the correct plane, which in this case is surface 11, the conductor lines 7 are aligned to the termination pads 6 by rotating the conductive lead structure 13 in the same plane as the termination end 18 through use of the manipulator 1. Note that now, termination end 18 is in the plane of surface 11, which is normal to the plane of the figure. The alignment is now accomplished in the same manner as was described with FIG. 5. A tool or robotic end effectuator is applied to the tooling holes 5 and a rotational moment applied. With conductor lines 7 being anchored to hook 4, they can be manipulated by the rotational moment until they are aligned with termination pads 6. Once termination is completed, flexible anchor tabs 2 are delaminated from the stainless steel base layer of conductive lead structure 13 and conductor lines 7 are broken from hook 4 by rotating manipulator 1 out of the plane of termination end 18. The strain relief tab 3 may be secured to the actuator arm to provide further support to the conductive lead structure.

The present invention provides a manipulator which is fabricated as part of a laminated suspension used in a disk drive system. This manipulator serves the purpose of aligning conductor lines that transmit signals to and from a slider transducer with termination pads on an arm electronics package or flex cable attached to an actuator arm. The manipulator allows all these conductor lines to be aligned and terminated simultaneously. By fabricating the conductive lead structure and the fixture as part of a laminated suspension using photolithography techniques, a fixed and highly toleranced positioning of the conductor lines relative to each other can be maintained. Furthermore, this spaced relationship is highly repeatable with subsequently fabricated laminated suspensions. Moreover, the manipulator limits the degrees of freedom to a mere rotation, thus limiting the skill required of an operator or the complexity of a robot for performing the termination. After performing the alignment and termination procedures, the manipulator is simply removed without the need for special tools and then discarded.

While the invention has been particularly shown and described with reference to a preferred embodiment, it will be understood by those skilled in the art that various changes in form and detail may be made therein without departing from the spirit and scope of the invention.

I claim:

1. A multilayered suspension being arranged for use in an information storage system slider-suspension assembly, comprising:

a conductive lead structure, formed from one or more layers of the multilayered suspension, having a slider end and a termination end and at least one conductor line contained in a patterned conductive layer, the conductive lead structure being arranged on the slider end for connection to transducer leads of a slider, and on the termination end for connection to arm-electronics termination pads; and a fixture, formed from one or more layers of the multilayered suspension, being substantially in the same plane as the termination end of the conductive lead structure and having one or more anchor tabs attached to the conductive lead structure, wherein the fixture aligns the at least one conductor line to at least one termination pad of the termination pads by rotating the termination end of the conductive lead structure relative to the slider end of the conductive lead structure along the plane of the termination end of the conductive lead structure.

2. A multilayered suspension according to claim 1, wherein the one or more anchor tabs are detachable from the conductive lead structure such that the fixture is removably attached to the conductive lead structure such that the fixture can be removed from the conductive lead structure after attachment of the at least one conductor line to at least one of the termination pads.

3. A multilayered suspension according to claim 1, wherein the one or more anchor tabs are detachable from the conductive lead structure by delaminating at least one layer of said one or more anchor tabs from a layer of the conductive lead structure.

4. A multilayered suspension according to claim 1, wherein the one or more anchor tabs are detachable from the conductive lead structure by tearing or cutting the one or more anchor tabs in half along a region of reduced cross-sectional area.

5. A multilayered suspension according to claim 1, wherein at least one anchor tab of the one or more anchor tabs is a flexible anchor tab formed from one or more layers near the termination end.

6. A multilayered suspension according to claim 5, wherein the one or more anchor tabs have a reduced cross section to facilitate buckling when a rotational force in the plane of the termination end is applied to the fixture.

7. A multilayered suspension according to claim 5, wherein the one or more anchor tabs include two anchor tabs which are spaced such that a first tab of the two anchor tabs will buckle and a second tab of the two anchor tabs will be in tension when a clockwise rotational force is applied to the fixture, and wherein the first tab will be in tension and the second tab will buckle when a counter-clockwise rotational force is applied to the fixture.

8. A multilayered suspension according to claim 1, wherein the fixture includes a hook arm extending along the end of the conductive lead structure at the termination end, the hook arm being removably attached to the end of the at least one conductor line.

9. A multilayered suspension according to claim 8, wherein the hook arm has a test pad for a respective one of the at least one conductor line fixed to and spaced along the length of the hook arm.

10. A multilayered suspension according to claim 1, wherein the conductive lead structure has a bend region which allows it to be bent along a bend axis, the at least one conductor line running over the conductive lead structure such that the at least one conductor line traverses the bend region approximately perpendicular to the bend axis.

11. A multilayered suspension according to claim 10, wherein the bend region is of reduced thickness.

12. A multilayered suspension according to claim 1, wherein the fixture contains holes arranged for manipulation by a robotic end effector.

13. A multilayered suspension according to claim 1, wherein the conductive lead structure is comprised of a base layer, an insulating layer and the patterned conductive layer.

14. A multilayered suspension according to claim 13, wherein the base layer is stainless steel, the insulating layer is polyimide, and the patterned conductive layer is copper.

15. An actuator arm assembly for an information storage system, comprising:
an actuator arm having arm-electronics termination pads;
a multilayered suspension mechanically attached to the actuator arm, said multilayered suspension including a conductive lead structure having a termination end and a slider end, formed from one or more layers of the multilayered suspension, having at least one conductor line contained in a patterned conductive layer, the conductive lead structure being arranged for electrical attachment to transducer leads of a slider at one end, being electrically attached to the actuator arm on the termination end, the at least one conductor line being terminated at the arm-electronics termination pads; and
a fixture, formed from one or more layers of the multilayered suspension, being substantially in the same plane as the termination end of the conductive lead structure and having one or more anchor tabs attached to the conductive lead structure, wherein the fixture aligns the at least one conductor line to at least one termination pad of the termination pads by rotating the termination end of the conductive lead structure relative to the slider end of the conductive lead structure along the plane of the termination end of the conductive lead structure.

16. An actuator arm assembly according to claim 15, wherein the one or more anchor tabs are detachable from the conductive lead structure such that the fixture is removably attached to the conductive lead structure such that the fixture can be removed from the conductive lead structure after attachment of the at least one conductor line to at least one of the termination pads.

17. An actuator arm assembly according to claim 15, wherein the one or more anchor tabs are detachable from the conductive lead structure by delaminating at least one layer of the one or more anchor tabs from a layer of the conductive lead structure.

18. An actuator arm assembly according to claim 15, wherein the one or more anchor tabs are detachable from the conductive lead structure by tearing or cutting the one or more anchor tabs in half along a region of reduced cross-sectional area.

19. An actuator arm assembly according to claim 15, wherein at least one anchor tab of the one or more anchor tabs is a flexible anchor tab formed from one or more layers near the termination end.

20. An actuator arm assembly according to claim 19, wherein the one or more anchor tabs have a reduced cross section to facilitate buckling when a rotational force in the plane of the termination end is applied to the fixture.

21. An actuator arm assembly according to claim 19, wherein the one or more anchor tabs include two anchor tabs which are spaced such that a first tab of the two anchor tabs will buckle and a second tab of the two anchor tabs will be in tension when a clockwise rotational force is applied to the fixture, and wherein the first tab will, be in intension and the second tab will buckle when a counter-clockwise rotational force is applied to the fixture.

22. An actuator arm assembly according to claim 15, wherein the fixture includes a hook arm extending along the end of the conductive lead structure at the termination end, the hook arm being removably attached to the end of the at least one conductor line.

23. An actuator arm assembly according to claim 22, wherein the hook arm has a test pad for a respective one of the at least one conductor line fixed to and spaced along the length of the hook arm.

24. An actuator arm assembly according to claim 15, wherein the conductive lead structure has a bend region which allows it to be bent along a bend axis, the at least one conductor line running over the conductive lead structure such that the at least one conductor line traverses the bend region approximately perpendicular to the bend axis.

25. An actuator arm assembly according to claim 24, wherein the bend region is of reduced cross-sectional area.

26. An actuator arm assembly according to claim 15, wherein the fixture contains holes arranged for manipulation by a robotic end effector.

27. An actuator arm assembly according to claim 15, wherein the conductive lead structure is comprised of a base layer, an insulating layer and the patterned conductive layer.

28. An actuator arm assembly according to claim 27, wherein the base layer is stainless steel, the insulating layer is polyimide, and the patterned conductive layer is copper.

29. An actuator arm assembly for an information storage system, comprising:
an actuator arm having arm-electronics termination pads;
a multilayered suspension mechanically attached to the actuator arm at an attachment point;
a conductive lead structure having at least one conductor line contained in a patterned conductive layer formed over one or more layers of the multilayered suspension, the conductive lead structure having a slider end for connection to transducer leads of a slider and a termination end for connection to the arm-electronics termination pads, the at least one conductor line being terminated at the arm-electronics termination pads, wherein the termination end extends out beyond the attachment point; and
a fixture, formed from one or more layers of the multilayered suspension, being substantially in the same plane as the termination end of the conductive lead structure and having one or more anchor tabs attached to the conductive lead structure, wherein the fixture aligns the at least one conductor line to at least one arm-electronics termination pad of the arm-electronics termination pads by rotating the termination end of the conductive lead structure relative to the slider end of the conductive lead structure along the plane of the termination end of the conductive lead structure.

30. An actuator arm assembly according to claim 29, wherein the one or more anchor tabs are detachable from the conductive lead structure such that the fixture is removably attached to the conductive lead structure and can be removed from the conductive lead structure after attachment of the at least one conductor line to at least one of the arm-electronics termination pads.

31. An actuator arm assembly according to claim 30, wherein the one or more anchor tabs are detachable from the conductive lead structure by delaminating at least one layer of the one or more anchor tabs from a layer of the conductive lead structure.

32. An actuator arm assembly according to claim 30, wherein the one or more anchor tabs are detachable from the conductive lead structure by tearing or cutting the one or more anchor tabs in half along a region of reduced cross-sectional area.

33. An actuator arm assembly according to claim 29, wherein at least one anchor tab of the one or more anchor tabs is a flexible anchor tab formed from one or more layers near the termination end.

34. An actuator arm assembly according to claim 29, wherein an anchor tab of the one or more anchor tabs has a reduced cross section to facilitate buckling when a rotational force in the plane of the termination end is applied to the fixture.

35. An actuator arm assembly according to claim 34, wherein the one or more anchor tabs include two anchor tabs which are spaced such that a first tab of the two anchor tabs will buckle and a second tab of the two anchor tabs will be in tension when a clockwise rotational force is applied to the fixture, and wherein the first tab will be in tension and the second tab will buckle when a counter-clockwise rotational force is applied to the fixture.

36. An actuator arm assembly according to claim 29, wherein the fixture includes a hook arm extending along the end of the conductive lead structure at the termination end, the hook arm being removably attached to the end of the at least one conductor line.

37. An actuator arm assembly according to claim 36, wherein the hook arm has a test pad for a respective one of the at least one conductor line fixed to and spaced along the length of the hook arm.

38. An actuator arm assembly according to claim 29, wherein at least one anchor tab of the one or more anchor tabs is a flexible anchor tab formed from one or more layers near the termination end.

39. An actuator arm assembly according to claim 29, wherein the fixture contains holes arranged for manipulation by a robotic end effector.

40. An actuator arm assembly according to claim 29, wherein the conductive lead structure has a bend region which allows it to be bent along a bend axis, the at least one conductor line running over the conductive lead structure such that the at least one conductor line traverses the bend region approximately perpendicular to the bend axis.

41. An actuator arm assembly according to claim 40, wherein the bend region is of reduced thickness.

42. An actuator arm assembly according to claim 29, wherein the conductive lead structure is comprised of a base layer, an insulating layer and the patterned conductive layer.

43. An actuator arm assembly according to claim 42, wherein the base layer is stainless steel, the insulating layer is polyimide, and the patterned conductive layer is copper.

44. A multilayered suspension arranged for use in an information storage system slider-suspension assembly, said multilayered suspension having an attachment point for connection to an actuator arm, comprising:

a conductive lead structure having at least one conductor line contained in a patterned conductive layer formed over one or more layers of the multilayered suspension, the conductive lead structure having a slider end for connection to transducer leads of a slider and a termination end for connection to arm-electronics termination pads, wherein the termination end extends out beyond the attachment point; and a fixture, formed from one or more layers of the multilayered suspension, being substantially in the same plane as the termination end of the conductive lead structure and having one or more anchor tabs attached to the conductive lead structure, wherein the fixture aligns the at least one conductor line to at least one termination pad of the termination pads by rotating the termination end of the conductive lead structure relative to the slider end of the conductive lead structure along the plane of the termination end of the conductive lead structure.

45. A multilayered suspension according to claim 44, wherein the fixture includes a hook arm extending along the end of the conductive lead structure at the termination end, the hook arm being removably attached to the end of the at least one conductor line.

46. A multilayered suspension according to claim 45, wherein the hook arm has a test pad for a respective one of the at least one conductor line fixed to and spaced along the length of the hook arm.

47. A multilayered suspension according to claim 44, wherein the fixture contains holes arranged for manipulation by a robotic end effector.

48. A multilayered suspension according to claim 44, wherein the conductive lead structure has a bend region which allows it to be bent along a bend axis, the at least one conductor line running over the conductive lead structure such that the at least one conductor line traverses the bend region approximately perpendicular to the bend axis.

49. A multilayered suspension according to claim 48, wherein the bend region is of reduced thickness.

50. A multilayered suspension according to claim 44, wherein the conductive lead structure is comprised of a base layer, an insulating layer and the patterned conductive layer.

51. A multilayered suspension according to claim 50, wherein the base layer is stainless steel, the insulating layer is polyimide, and the patterned conductive layer is copper.

52. A multilayered suspension according to claim 44, wherein the one or more anchor tabs are detachable from the conductive lead structure such that the fixture is removably attached to the conductive lead structure and can be removed from the conductive lead structure after attachment of the at least one conductor line to at least one of the termination pads.

53. A multilayered suspension according to claim 52, wherein the one or more anchor tabs are detachable from the conductive lead structure by delaminating at least one layer of said one or more anchor tabs from a layer of the conductive lead structure.

54. A multilayered suspension according to claim 52, wherein the one or more anchor tabs are detachable from the conductive lead structure by tearing or cutting the one or more anchor tabs in half along a region of reduced cross-sectional area.

55. A multilayered suspension according to claim 44, wherein at least one anchor tab of the one or more anchor tabs is a flexible anchor tab formed from one or more layers near the termination end.

56. A multilayered suspension according to claim 44, wherein an anchor tab of the one or more anchor tabs has a reduced cross section to facilitate buckling when a rotational force in the plane of the termination end is applied to the fixture.

57. A multilayered suspension according to claim 56, wherein the one or more anchor tabs include two anchor tabs which are spaced such that a first tab of the two anchor tabs will buckle and a second tab of the two anchor tabs will be in tension when a clockwise rotational force is applied to the fixture, and wherein the first tab will be in tension and the second tab will buckle when a counter-clockwise rotational force is applied to the fixture.

58. A multilayered suspension according to claim 44, wherein at least one anchor tab of the one or more anchor tabs is a flexible anchor tab formed from one or more layers near the termination end.

* * * * *

UNITED STATES PATENT AND TRADEMARK OFFICE
CERTIFICATE OF CORRECTION

PATENT NO. : 5,708,541
DATED : Jan. 13, 1998
INVENTOR(S) : A. David Erpelding

It is certified that error appears in the above-indentified patent and that said Letters Patent is hereby corrected as shown below:

In col. 12, line 13, please delete the words following "tab" and insert instead --will be in tension and the--.

Signed and Sealed this

Twenty-third Day of June, 1998

Attest:

BRUCE LEHMAN

Attesting Officer

Commissioner of Patents and Trademarks